(12) United States Patent
Coulmeau et al.

(10) Patent No.: US 8,352,169 B2
(45) Date of Patent: Jan. 8, 2013

(54) METHOD FOR ASSISTING IN THE MANAGEMENT OF A FLIGHT IN ORDER TO KEEP TO A TIME CONSTRAINT

(75) Inventors: François Coulmeau, Seilh (FR); Xavier Blanchon, Toulouse (FR); Philippe Chaix, Tournefeuille (FR)

(73) Assignee: Thales, Neuilly sur Seine (FR)

( * ) Notice: Subject to any disclaimer, the term of this patent is extended or adjusted under 35 U.S.C. 154(b) by 253 days.

(21) Appl. No.: 12/870,666

(22) Filed: Aug. 27, 2010

(65) Prior Publication Data

US 2011/0077858 A1 Mar. 31, 2011

(30) Foreign Application Priority Data

Aug. 28, 2009 (FR) ..................................... 09 04107

(51) Int. Cl.
*G06G 7/76* (2006.01)
*G06F 19/00* (2011.01)

(52) U.S. Cl. .......................... 701/121; 701/120; 701/465

(58) Field of Classification Search .......... 271/120–123, 271/465, 3, 467, 528
See application file for complete search history.

(56) References Cited

U.S. PATENT DOCUMENTS

| | | | | |
|---|---|---|---|---|
| 5,121,325 | A * | 6/1992 | DeJonge | 701/123 |
| 6,507,782 | B1 * | 1/2003 | Rumbo et al. | 701/121 |
| 2011/0029158 | A1 * | 2/2011 | Klooster | 701/3 |
| 2011/0077859 | A1 * | 3/2011 | Coulmeau et al. | 701/204 |
| 2012/0029802 | A1 * | 2/2012 | Barry et al. | 701/120 |

FOREIGN PATENT DOCUMENTS

| | | |
|---|---|---|
| EP | 0 637 787 | 2/1995 |
| EP | 1 538 504 | 6/2005 |
| EP | 1 564 527 | 8/2005 |
| FR | 2 907 952 | 5/2008 |
| FR | 2 913 780 | 9/2008 |
| FR | 2 921 153 | 3/2009 |

OTHER PUBLICATIONS

Search Report, issued on Mar. 22, 2010, for 0904107, filed on Aug. 28, 2009.

* cited by examiner

*Primary Examiner* — Patrick Cicchino
(74) *Attorney, Agent, or Firm* — Stroock & Stroock & Lavan LLP

(57) ABSTRACT

Method for assisting in the flight management of an aircraft aiming to reach a constraint point on a predetermined lateral trajectory that is assumed to have to be followed by the aircraft, at a required time of arrival RTA, said aircraft occupying a current position defined by a current altitude with a current horizontal speed. The method including, when it follows a rallying flight plan, calculating a new rallying flight plan following the lateral trajectory to be followed and including a new estimated speed profile different from the estimated speed profile over at least one update area, the new estimated speed profile including, over said update areas, either a value greater than that of the estimated speed profile, if the arrival time difference is positive, or a value less than that of the estimated speed profile, if the arrival time difference is negative.

12 Claims, 3 Drawing Sheets

METHOD FOR ASSISTING IN THE MANAGEMENT OF A FLIGHT IN ORDER TO KEEP TO A TIME CONSTRAINT

CROSS-REFERENCE TO PRIOR APPLICATIONS

The application claims priority to French Patent Application No. 0904107, filed on Aug. 28, 2009, which is incorporated by reference herein in its entirety.

FIELD OF THE INVENTION

The invention relates to the field of civil aeronautics and relates to the aircraft flight management systems. More specifically, the invention relates to a method for assisting in the management of a flight in order to keep to a time constraint. The flight management systems, better known by the acronym FMS, now equip all civilian aircraft. An FMS consists of various functional components which enable the crew of an aircraft to programme a flight from a navigation database. The flight plan to be followed is the flight plan that is assumed to have to be followed by the aircraft with predetermined tolerances. It includes a vertical trajectory to be followed and a lateral trajectory to be followed (which correspond respectively to the trajectories to be followed in the vertical plane and in the horizontal plane) and a speed profile to be followed (which is in fact all the values of the component of the speed to be followed in the horizontal plane) that are assumed to have to be followed by the aircraft with respective tolerances, enabling the aircraft to reach its destination. The calculations of the flight plans are based on the characteristics of the aircraft, on the data supplied by the crew and on the environment of the system. The positioning and guidance functions then collaborate in order to enable the aircraft to remain on the trajectories defined by the FMS. The trajectories to be followed are constructed from a skeleton trajectory formed by a succession of waypoints associated with various flight setpoints, such as altitude, speed, heading, and other setpoints. A trajectory is constructed from a sequencing of segments or curves linking the waypoints in pairs from the departure point to the destination point. The speed profile to be followed is a curve representing the trend of the speed that is assumed to have to be followed by the aircraft, the guidance module included in the FMS having for its primary function to determine, at any instant of the flight, a guidance setpoint including a set of commands for the aerodynamic equipment of the aircraft so that the latter will follow the speed profile, that is to say, so that the speed of the aircraft has, at each instant, the speed determined by the profile.

An aspect of the invention improves the capabilities of the aircraft in order to enable them to reach particular points at a required time, with maximum accuracy. This need devolves from the ongoing increase in air traffic and the corresponding workload for air traffic controllers. Thus, for safety reasons, but also in the interests of economic viability, it becomes essential to impose time constraints on the aircraft, in descent and approach phases following the descent. The aircraft thus reach a particular waypoint, called constraint point, in their flight plan at a required time. These particular points may be a landing runway threshold, an aircraft flow convergence point, particularly frequented crossing points, etc. This may make it possible, for example, to smooth the flow of aircraft before the approach phase.

BACKGROUND

These days, the FMS calculates a flight plan to be followed which reaches the particular points of the flight plan at precise times, in the most effective manner possible and, for example, in the most economic manner possible. The flight plan to be followed is calculated so as to observe a required time of arrival at a constraint point (that is to say, so that the aircraft reaches the constraint point at the required time of arrival), this time being commonly referred to by the acronym RTA standing for "Required Time at Arrival".

Currently, the FMS of an aircraft regularly checks whether the aircraft is following the flight plan to be followed. When, at a current position on the lateral trajectory, the aircraft departs from the flight plan to be followed (that is to say, departs from the predetermined tolerances in the vertical flight plan or in the speed profile relative to the respective trajectories in these plans), the FMS calculates a new flight plan, called rallying flight plan, that is assumed to have to be followed by the aircraft that has left the flight plan to be followed, rallying the flight plan to be followed. The rallying flight plan includes an estimated lateral trajectory, an estimated vertical trajectory and an estimated speed profile. To rally the flight plan to be followed, it is understood that the estimated vertical trajectory, the estimated lateral trajectory and the estimated speed profile respectively converge with the vertical and lateral trajectories to be followed and the speed profile of the flight plan to be followed until they are rallied. The rallying flight plan is calculated by prediction based on a current position of the aircraft. When the aircraft is assumed to follow a predetermined lateral trajectory, the rallying flight plan includes an estimated speed profile, an estimated vertical trajectory and the lateral trajectory. The speed profile to be followed is the horizontal component of the speed to be followed. When the estimated speed profile rejoins the speed profile to be followed, it is therefore the horizontal component of the estimated speed that converges with the speed profile to be followed. In aeronautics, the quantities used to define the speed profile are the CAS (Calibrated Air Speed, corresponding to the speed indicated on the onboard instruments) and the MACH (corresponding to the Mach number). The "horizontal speed component to be followed" (hereinafter called "speed profile to be followed") therefore corresponds to one of these quantities. The term "horizontal speed" will hereinafter be used to mean the component of the speed of the aeroplane in the horizontal plane, expressed in the units of these CAS or MACH quantities. The rallying flight plan is obtained by integrating the state vector of the aircraft, from a current position P of the aircraft, along the future lateral trajectory (in other words with constant lateral trajectory) according to a rallying guidance setpoint.

A prediction calculation performed to rally the flight plan to be followed corresponds to integrating the state of the aircraft (according to equation 1 below) on the basis of a guidance setpoint, called rallying guidance setpoint, adapted so that the aircraft rallies with the flight plan to be followed. In practice, the state X of the aeroplane is conventionally linked to the guidance setpoint U by the following equation:

$$dX/dt = f(X, U) \quad (1)$$

in which dX/dt is the derivative of the state of the aircraft relative to time.

The state of the aircraft is a vector conventionally including the following coordinates: the position of the aircraft in the horizontal plane, its altitude, its ground speed (or speed of the aircraft relative to the ground), its vertical speed, the air speed (or speed in the air mass), the fuel, time). The ground speed is equal to the air speed to which the wind is added (the whole as a vector, projected onto the horizontal plane). The speed of the aircraft is the vector consisting of the vertical speed and the ground speed of the aircraft, as a vector.

FIGS. 1a and respectively 1b show, on a descent and approach phase between a departure point PD and an arrival point PA situated at a distance da from the departure point, examples of curves of variation of the altitude and respectively of the horizontal speed of an aircraft according to the distance traveled over the lateral trajectory. The curves represented as solid lines in FIGS. 1a and 1b respectively, show the vertical trajectory to be followed PH and the speed profile to be followed PV. The curves represented as dotted lines in FIGS. 1a and 1b respectively represent an estimated vertical trajectory PHE and, respectively, an estimated speed profile PVE. In FIGS. 1a and 1b, it will be observed that, at the current point P situated at a distance dP from the start of the descent phase on the lateral trajectory, the aircraft has a current horizontal speed V and current altitude H. In FIG. 1a, the current altitude is greater than the altitude h defined by the vertical trajectory to be followed PH at the current point. The altitude difference DH is greater, as an absolute value, than a predetermined altitude tolerance TH that is not represented.

The state of the aircraft is integrated according to the rallying guidance setpoint including, between the current point P and a rejoining point at horizontal speed RV situated at a distance dv from the departure point, a rejoining guidance setpoint. More particularly, between the current point P and a first point P1 situated at a distance d1 from the departure point, a rejoining guidance setpoint of the idle thrust acceleration type is chosen such that the FPA slope (not represented) formed between the aircraft and the ground, is greater than that which is defined by the vertical trajectory to be followed in order to enable the aircraft to converge with the vertical trajectory to be followed. Between the current point and the point P1, the estimated horizontal speed of the aircraft increases (and is greater than the horizontal speed of the speed profile to be followed). Once the estimated vertical trajectory is sufficiently close to the vertical trajectory to be followed, in this at the point P1, the FMS integrates the state of the aircraft according to a rejoining guidance setpoint of the idling type, in order for the estimated vertical trajectory to rejoin the trajectory to be followed (at the altitude rejoining point RH situated at a distance dh from the departure point) and the estimated speed rejoins the speed to be followed (at the speed rejoining point RV). For a conventional aircraft in which the vector U of guidance setpoints includes two components, namely the trim of the aeroplane (or FPA slope) and the thrust of the engines, it is possible to use the trim to accelerate (increase the thrust) or slow down (reduce the trim).

As soon as the estimated vertical speed and the estimated vertical trajectory have rejoined the speed profile to be followed and, respectively, the vertical trajectory to be followed, that is to say, between the speed rejoining point RV and the arrival point PA situated at a distance da from the departure point, the FMS integrates the state of the aircraft along the flight plan to be followed. Everything takes place as if the FMS were integrating the state of the aircraft according to a guidance profile called following guidance setpoint adapted so that the estimated speed profile and the estimated vertical trajectory are equal, to within the respective tolerances, to the speed profile to be followed and to the vertical trajectory to be followed. In other words, after the respective rallying points, the estimated profiles and trajectories respectively follow the profiles and trajectories to be followed. The rallying guidance setpoint therefore includes a rejoining guidance setpoint followed by a following guidance setpoint.

The FMS calculates the estimated time of arrival at the constraint point, namely the time at which the FMS predicts that the aircraft will arrive at the constraint point. The estimated time of arrival is commonly designated by the acronym ETA (Estimated Time of Arrival). It is conventionally calculated by integrating the state vector X of the aircraft according to the rallying guidance setpoint on the future lateral trajectory. If the estimated time of arrival departs from a predetermined tolerance, called absolute tolerance T, relative to the required time of arrival RTA, a new calculation cycle takes place, causing the FMS to redefine the flight plan to be followed by taking account of the time constraint to be observed and a rallying flight plan when the aircraft departs from the flight plan to be followed. The aim is to have the estimated time of arrival calculated from the guidance setpoint converge with the required time of arrival. The tolerance with respect to the required time of arrival is generally modelled in the form of a funnel, which means that it becomes narrower as the aircraft approaches the constraint point. For the calculation of the rallying flight plan in the case where the aircraft is following a predetermined lateral trajectory, the FMS has only two degrees of freedom, namely thrust and trim, to define the rallying guidance setpoints in order to rally with the flight plan to be followed. Thus, the guidance setpoint acts on the speed of the aircraft.

The time of passage at a determined point (or time profile) is a consequence of the speed profile, so each time the aircraft leaves the vertical trajectory to be followed, the guidance setpoint determined by the guidance module acting on the horizontal speed of the aircraft causes the keeping to the time constraint to fail. A divergent infinite loop then takes place in the previously described iteration process generally resulting in failure to comply with the time constraint, but also possibly having a negative impact on the observance of the altitude and speed profiles to be followed.

Operationally, the pilot observes that, immediately after the calculation of a flight plan to be followed, the aircraft observes the time constraint but that, after the determination of a guidance setpoint bringing the aircraft to the flight plan to be followed, the aeroplane starts to deviate in time from the time constraint. After a certain time, the estimated time of arrival differs from the required time of arrival and a new calculation of the speed profile and of the vertical trajectory to be followed takes place to try to observe this time constraint, resulting in the calculation of a new guidance setpoint, different from the preceding one. From the guidance point of view, this results in hops, engine jolts if the guidance setpoints for rejoining change from one loop to another. Since the aeroplane guidance does not succeed in being stabilized on a guidance setpoint which observes the constraint, the flight management system is not reliable. The crew has a tendency to finish its manoeuvre manually. Moreover, the changes of guidance setpoint are uncomfortable for the passengers. The instability of the status of the time constraint (which changes from the "success" state to the "fail" state in each iteration) is also counter-productive with regard to the air traffic control authorities which are generally the source of the time constraint. The authorities observe that the aeroplane is no longer observing a time constraint and may therefore take a decision that is pointless, or even counter-productive, to manage the guidance of the aircraft.

SUMMARY

An embodiment of the invention provides a method for assisting in the flight management of an aircraft aiming to achieve a constraint point on a predetermined lateral trajectory assumed to have to be followed by the aircraft, at a required time of arrival, the aircraft occupying, at a given instant, a current position defined by a current altitude with a current horizontal speed, the method including the following steps:

- detection of a possible deviation between the aircraft and a flight plan to be followed that the aircraft is assumed to have to follow, the flight plan to be followed including a lateral trajectory, a speed profile to be followed and a vertical trajectory to be followed and being calculated to observe a calculated required time of arrival at the constraint point,
- when the aircraft deviates from the flight plan to be followed (that is to say, when there is a deviation between the aircraft and the flight plan to be followed), calculation of a rallying flight plan, rallying the flight plan to be followed, the rallying flight plan including an estimated vertical trajectory and an estimated speed profile,
- calculation of an estimated time of arrival at the constraint point based on the rallying flight plan,
- calculation of an arrival time difference between the estimated time of arrival and the calculated required time of arrival,
- comparison between the arrival time difference and an absolute tolerance, the method also including the following step:
- when the arrival time difference departs from the absolute tolerance, calculation of a new rallying flight plan following the lateral trajectory to be followed and including a new estimated speed profile different from the estimated speed profile over at least one update area, the new estimated speed profile exhibiting, over the update area(s):
- either a value greater than that of the estimated speed profile, if the arrival time difference is positive,
- or a value less than that of the estimated speed profile, if the arrival time difference is negative.

The method according to an embodiment of the invention includes:

- the estimated vertical trajectory and the estimated speed profile respectively include an estimated rejoining speed profile and an estimated rejoining vertical trajectory respectively rallying the speed profile to be followed and the vertical trajectory to be followed, at respective speed rejoining and vertical rejoining points, and being continued respectively by an estimated following speed profile and an estimated following vertical trajectory, respectively merged with the speed profile, the speed profile to be followed and the vertical trajectory to be followed, the update area(s) including at least one following level area on which the estimated following vertical trajectory exhibits a level and/or at least one following level variation area on which the estimated following vertical trajectory exhibits a variable level and/or at least one rejoining level area on which the estimated rejoining vertical trajectory exhibits a level and/or at least one rejoining level variation area on which the estimated rejoining vertical trajectory exhibits a variable level,
- the step for calculation of a new rallying flight plan includes a step for initializing the new rallying flight plan on the rallying flight plan and also includes at least one of the following pairs of steps: a first pair of steps, including a step for identification of one or more following level area(s) on which the estimated following vertical trajectory exhibits a level, and a step for updating the new rallying flight plan on the following level area(s), a second pair of steps, including a step for identification of one or more following level variation area(s) on which the estimated following vertical trajectory exhibits a level variation, and a step for updating the new rallying flight plan on the following level variation area(s), a third pair of steps, including a step for identification of one or more rejoining level area(s) on which the estimated vertical trajectory exhibits a level, and a step for updating the new rallying flight plan on the rejoining level area(s), a fourth pair of steps, including a step for identification of one or more rejoining level variation area(s) on which the estimated rejoining vertical trajectory exhibits a level variation, and a step for updating the new rallying flight plan on the rejoining level variation area(s),
- the pairs of steps include, prior to the step for updating the new rallying flight plan, a step for calculation of a new estimated rallying flight plan followed by a step for satisfying at least one predetermined constraint imposed on the new rallying flight plan and, if at least one constraint is not satisfied, a return to the step for identification of a level or rejoining area, otherwise a transition to the step for updating the new rallying flight plan,
- the step for calculation of a new rallying flight plan includes a plurality of successive pairs of steps taken from the first, the second, the third and the fourth pairs of steps and, between two successive pairs of steps including a pair of steps subsequent to a prior pair of steps, the method includes a step for checking compliance with the calculated required time of arrival including the following steps: calculation of an intermediate estimated time of arrival based on the new rallying flight plan, calculation of an intermediate difference between the intermediate estimated time of arrival and the calculated required time of arrival RTAc, comparison between the intermediate difference and the absolute tolerance, if the intermediate difference departs from the absolute tolerance, transition to the subsequent pair of steps;
- the update area(s) is (or are) situated before the constraint point on the lateral trajectory and/or before the approach phase;
- the following level and/or rejoining level and/or following level variation and/or rejoining area(s) that exhibit a length greater than a predetermined detection length on the lateral trajectory is/are identified as a priority;
- the step for detection of a deviation between the aircraft and the flight plan to be followed is preceded by a step for calculation of the flight plan to be followed that the aircraft is assumed to have to follow;
- the calculated required time of arrival is equal to the required time of arrival;
- it includes, prior to the step for detection of a possible deviation between the aircraft and the flight plan to be followed, a step for initializing the calculated required time of arrival on the value of the required time of arrival;
- it includes, subsequent to the step for calculation of a new rallying flight plan and before the return to the calculation of the flight plan to be followed: a step for calculation of a new estimated time of arrival NETA at the constraint point based on the new rallying flight plan, a step for calculation of a new arrival time difference NDA between the new estimated time of arrival NETA and the calculated required time of arrival RTAc, a step for comparing the new arrival time difference and the absolute tolerance, when the new arrival time difference (NDA) departs from a predetermined guidance tolerance it includes a step for calculation of a new calculated required time of arrival NRTAc dependent on the calculated required time of arrival RTAc and on a function (f) of the difference between the calculated required time of arrival RTAc and the new estimated time of arrival NETA satisfying the following equation NRTAc=f(RTAc−NETA)+RTAc and a step for replacing the calculated required time of arrival RTAc with a new calculated required time of arrival NRTAc, the new estimated speed profile exhibits, on the update area(s):

either a speed chosen such that it exhibits an acceleration greater than that of the estimated speed profile, if the arrival time difference is positive, or a speed chosen such that it exhibits a deceleration less than that of the estimated speed profile, if the arrival time difference is negative.

Another embodiment of the invention provides a system for assisting flight management including means for implementing the method according to an embodiment of the invention.

The method according to an embodiment the invention makes it possible, when an aircraft deviates from a flight plan to be followed, both to establish a guidance setpoint which enables the aircraft to rejoin the flight plan to be followed and to observe a time constraint. The reliability of the FMS is thus improved in terms of flight management. The improvements compared to the current situation affect not only the increase in the comfort of the passengers and the reduction in the stress of the crews because of the reduced number of complete changes of speed strategy, but also on the reduction of the workload of the air traffic controllers because of the reduction in the rate of missed time constraints.

BRIEF DESCRIPTION OF THE DRAWINGS

Other features and advantages of the invention will become apparent from reading the following detailed description, given as a nonlimiting example, and with reference to the appended drawings in which.

From one FIGURE to another, the same elements are identified by the same references.

DETAILED DESCRIPTION

An embodiment of the invention provides a flight management method for an aircraft aimed at observing a time constraint, intended to be implemented in a descent phase or in an approach phase.

Figure 2:
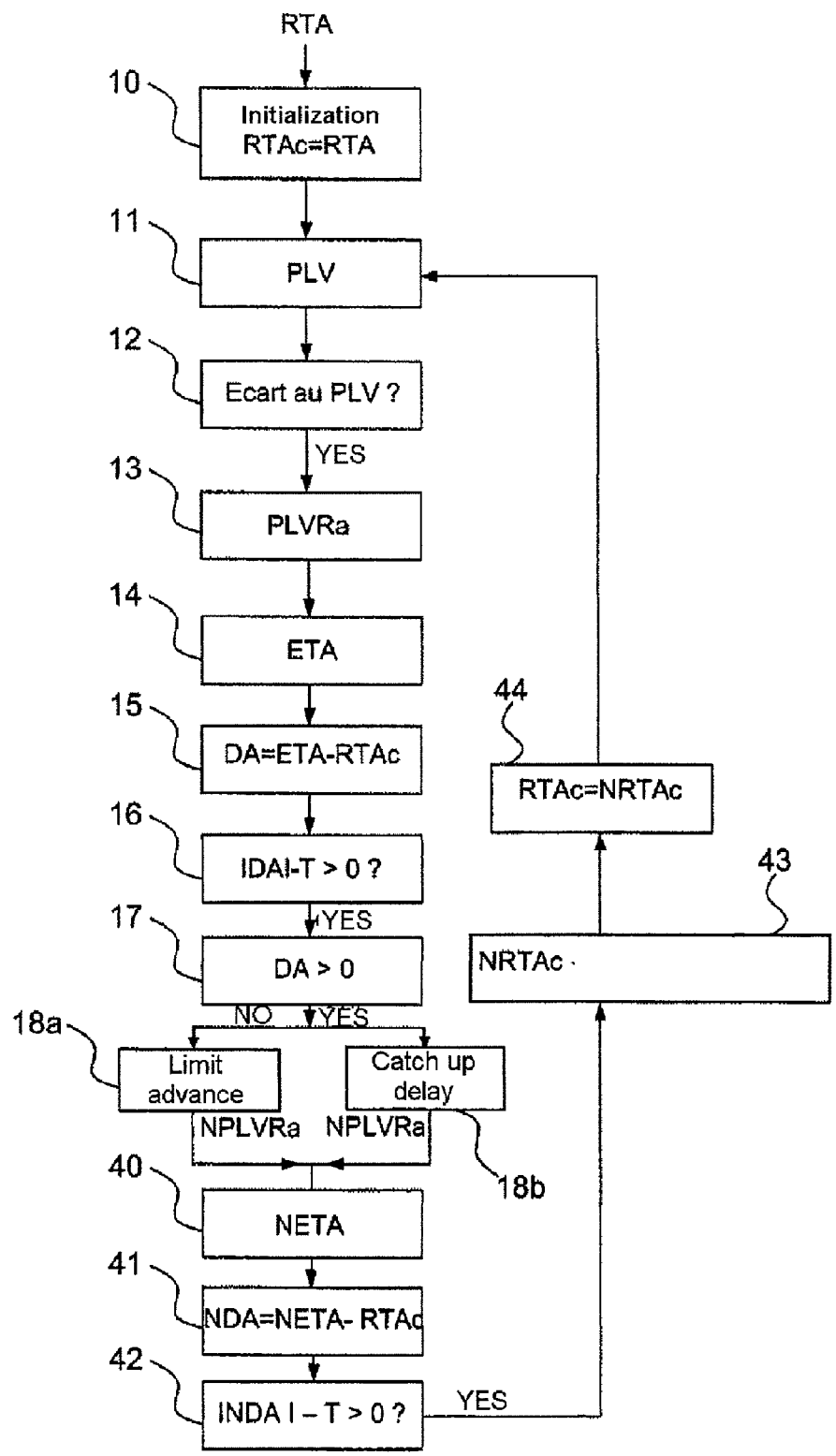

FIG. 2 diagrammatically shows the steps of an embodiment of a flight management method according to the invention to observe a time constraint RTA at a constraint point PC. The aircraft is, as we have seen previously, represented by a state vector X. Hereinafter in the description and the claims, it is assumed that the aircraft is permanently following a lateral trajectory PL. The term "following" should be understood to mean that the aircraft is permanently on a lateral trajectory merged, to within a tolerance, with the lateral trajectory to be followed. When it is stated that the aircraft moves away from the speed profile to be followed PV, it is understood that the horizontal speed of the aircraft moves away from a speed profile to be followed.

The method according to an embodiment of the invention conventionally includes:

a step 10 for initialization of a calculated required time of arrival RTAc at a constraint point PC on the value of the required time of arrival RTA at the constraint point PC, a step 11 for calculation of a flight plan to be followed PLV including a lateral trajectory to be followed PL, a vertical trajectory to be followed PH and a speed profile to be followed PV, assumed to have to be followed by the aircraft. The flight plan to be followed aims to observe the calculated required time of arrival RTAc at the constraint point PC, to within an absolute tolerance T. The flight plan to be followed is calculated by a conventional method. The speed profile to be followed is conventionally calculated to satisfy a first criterion. The first criterion consists, for example, in limiting the speed profile to a CAS/MACH pair for the phase including descent and rejoining, the CAS/MACH pair being taken from a space delimited by a speed envelope that the aircraft can physically adopt. The CAS and the MACH are dependent on a first economic optimization criterion, called Cost Index, on the weight of the aircraft, on the altitude and the temperature. The cost index is in fact an optimization criterion between the costs of time CT and the costs of fuel CF. The cost index is defined by CI=CT/CF. The first criterion may entail setting the cost index for the descent and approach phases or only in constraining the speed profile to be within a predetermined speed envelope delimiting the speeds between a bottom curve and a top curve. As a variant, the first criterion includes in taking into account other costs, such as nuisance costs (noises, polluting emissions, etc.).

The method according to an embodiment the invention also includes:

a step 12 for detection of a possible deviation between the aircraft, at a given instant, and the flight plan to be followed PLV, when the aircraft deviates from the flight plan to be followed, (that is to say when the deviation exists), a step for calculation 13 of a rallying flight plan PLVRa, rallying the flight plan to be followed PLV, the rallying flight plan including an estimated vertical trajectory PHE, an estimated speed profile PVE and the lateral trajectory PL. When the aircraft follows the flight plan to be followed, the subsequent steps are not implemented and the aircraft continues to follow this flight plan.

The calculation of the rallying flight PLVRa is conventionally calculated by prediction by integrating the state of the aircraft from the current point by means of a rallying guidance setpoint including a rejoining guidance setpoint and a following guidance setpoint, as described previously. The rallying flight plan is the flight plan assumed to have to be followed by the aircraft having left the flight plan to be followed. The FMS conventionally chooses rejoining guidance setpoints from rejoining guidance setpoints predetermined by the aircraft manufacturer acting on the thrust and the trim of the aircraft. These are, for example, setpoints of the SPD/THR type when the aircraft is above the profile or in overspeed mode and setpoints of VS/SPD or FPA/SPD type when the aircraft is under the altitude profile. Other guidance modes are possible according to the type of aircraft and the manufacturer. If 2 available commands are the trim and the thrust, then the SPD/THR mode is a guidance mode in which the horizontal speed (SPD for Speed) is servocontrolled by using the trim of the aircraft, and in which the engine thrust (THR for Thrust) is fixed. The vertical trend of the craft is therefore a consequence and not a setpoint in this case. The VS/SPD mode is a guidance mode in which the vertical speed (VS for Vertical Speed) is servocontrolled by using the trim of the aircraft, and in which the horizontal speed (SPD) is servocontrolled by modulating the engine thrust. The FPA/SPD mode is a guidance mode in which the ground slope of the aircraft (FPS for Flight Path Angle) is servocontrolled by using the trim of the aircraft, and in which the horizontal speed (SPD) is servocontrolled by modulating the engine thrust.

The rejoining guidance setpoint is preferably chosen such that the estimated speed profile satisfies a second optimization criterion. The second optimization criterion is, for example, a cost index aiming to set a CAS/MACH pairing that satisfies the speed during the rejoining phase. The CAS/MACH pairing preferably induces speeds, situated within the predetermined speed envelope, that the aircraft is physically capable of adopting. As a variant, the guidance setpoint that makes it possible to rally as quickly as possible with the flight plan to be followed is determined.

Figure 1B:
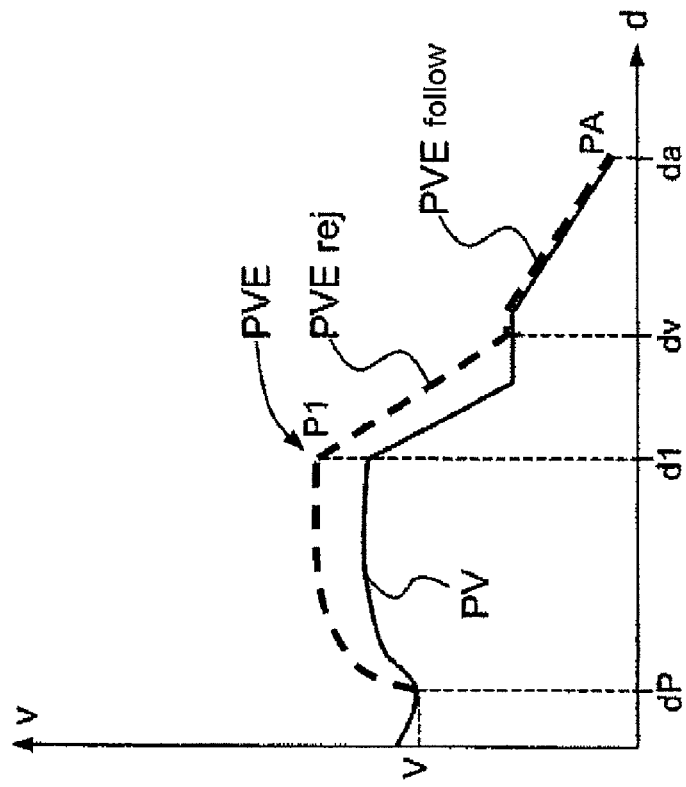
FIGS. 1a and 1b, already described, respectively represent, on a descent and approach phase, examples of curves of variation of the altitude and respectively of the horizontal speed of an aircraft according to the distance traveled over the lateral trajectory and an estimated vertical trajectory and an estimated speed profile of a rallying flight plan, FIG. 2 diagrammatically represents the steps of an embodiment of a flight management method according to the invention aiming to observe a time constraint at a constraint point, FIG. 3 diagrammatically represents the steps of an embodiment of the delay catch-up strategy.
Figure 1A:
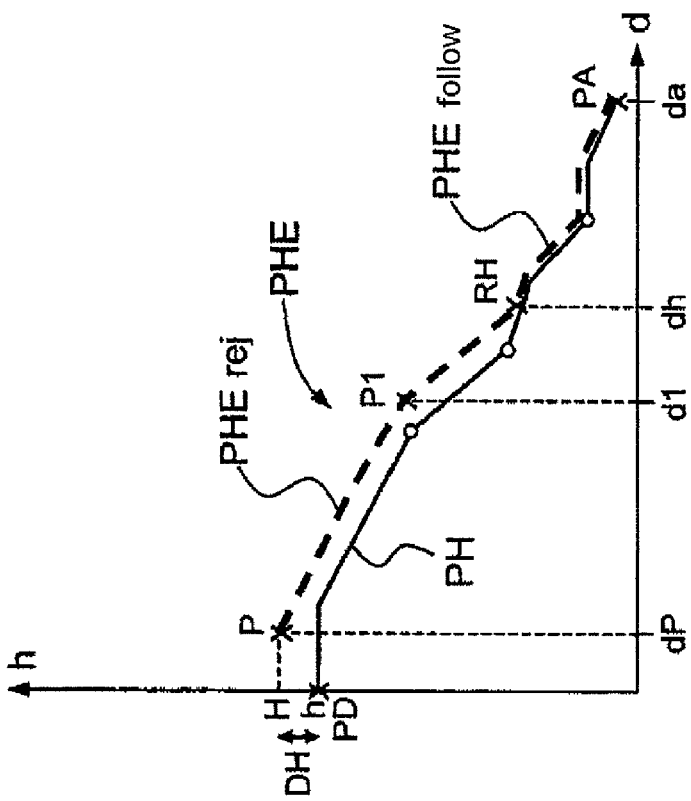

The rallying flight plan conventionally includes the lateral trajectory to be followed, an estimated vertical trajectory and an estimated speed profile. As represented in FIGS. 1a (altitude) and 1b (horizontal speed), the estimated vertical trajectory PHE includes an estimated rejoining vertical trajectory PHErej extending between the current point and the altitude rejoining point RH, followed by an estimated following vertical trajectory PHEfollow merged, to within a tolerance, with the vertical trajectory to be followed. The estimated speed profile PVE includes an estimated rejoining profile PVErej extending between the current point and the speed rejoining point RV, followed by an estimated following speed profile PVEfollow merged, to within a tolerance, with the speed profile to be followed.

When the aircraft follows a predetermined lateral trajectory, the step, not represented, for detection of a possible deviation at a given instant, between the aircraft occupying a current position P at a current altitude H with a current horizontal speed V and a flight plan to be followed conventionally includes the following steps:
 a step for calculation, at a given instant, of the altitude difference DH between the current altitude H and the altitude defined by the vertical profile to be followed PH at the current point and/or the speed difference DV between the current horizontal speed V and the horizontal speed defined by the speed profile to be followed PV at the current point.
 a step for comparison between the altitude difference DH and an altitude tolerance TH and/or between the speed difference DV and a speed tolerance TV.

The aircraft is assumed to be outside the flight plan if the altitude difference DH departs from the altitude tolerance TH and/or the speed difference DV departs from the speed tolerance TV.

The method according to the invention also includes, when the aircraft departs from the flight plan to be followed, the following steps:
 calculation 14 of an estimated time of arrival ETA at the constraint point PC based on the rallying flight plan PLVRa,
 calculation 15 of an arrival time difference DA between the estimated time of arrival ETA and the calculated required time of arrival RTAc,
 comparison 16 between the arrival difference DA and the absolute tolerance T.

A value departs from the absolute tolerance when its absolute value is greater than the absolute tolerance. The estimated time of arrival ETA is conventionally calculated, as described previously, by means of a prediction calculation consisting in integrating the state of the aircraft according to the rallying guidance setpoint on the lateral trajectory to be followed. When the estimated time of arrival does not depart from the absolute tolerance, the aircraft follows the rallying flight plan.

When the arrival time difference DA departs from the absolute tolerance T, the flight management method according to an embodiment of the invention refines the rallying flight plan by calculating a new rallying flight plan. More specifically, it includes the following steps:
 determination 17 of the sign of the arrival time difference DA,
 calculation 18a, 18b of a new rallying flight plan NPLVRa following the lateral trajectory to be followed PL and including a new estimated speed profile NPVE different from the estimated speed profile PVE on at least one update area, the new estimated speed profile NPVE exhibiting, on the area(s):
 either a value greater than that of the estimated speed profile PVE, if the arrival time difference is positive DA (a delay catch-up procedure then applies),
 or a value less than that of the estimated speed profile PVE, if the arrival time difference DA is negative (an advance limiting procedure then applies).

Thus, a new rallying flight plan that the aircraft is assumed to follow is calculated, which catches up at least some of the delay (or which limits at least partly the advance) of the aircraft relative to the flight plan and which rejoins the flight plan to be followed by having at least one phase in which the speed is greater (or lesser), with, possibly, an acceleration (or deceleration) that is stronger than that which was predicted by the rallying flight plan.

In other words, the FMS establishes a new rallying guidance setpoint different from the rallying guidance setpoint and chosen so as to generate, by integration of the state vector of the aircraft according to the new rallying guidance setpoint, a new flight plan including a new estimated speed profile as we have just defined. The new rallying flight plan NPLVRa includes the lateral trajectory PL, a new estimated speed profile NPVE and a new estimated vertical trajectory NPHE.

The method also works when the aircraft is travelling outside the lateral trajectory. In practice, in this case, there are, in most flight management systems for aircraft that are in operation, strategies for rejoining the lateral trajectory (for example at 45°) that make it possible to guarantee continuity between the current position and the lateral flight plan. It is then considered that the lateral rejoining up to a given point of the flight plan, followed by the rest of the flight plan, is our reference lateral flight plan for the calculations described in the invention.

Figure 3:
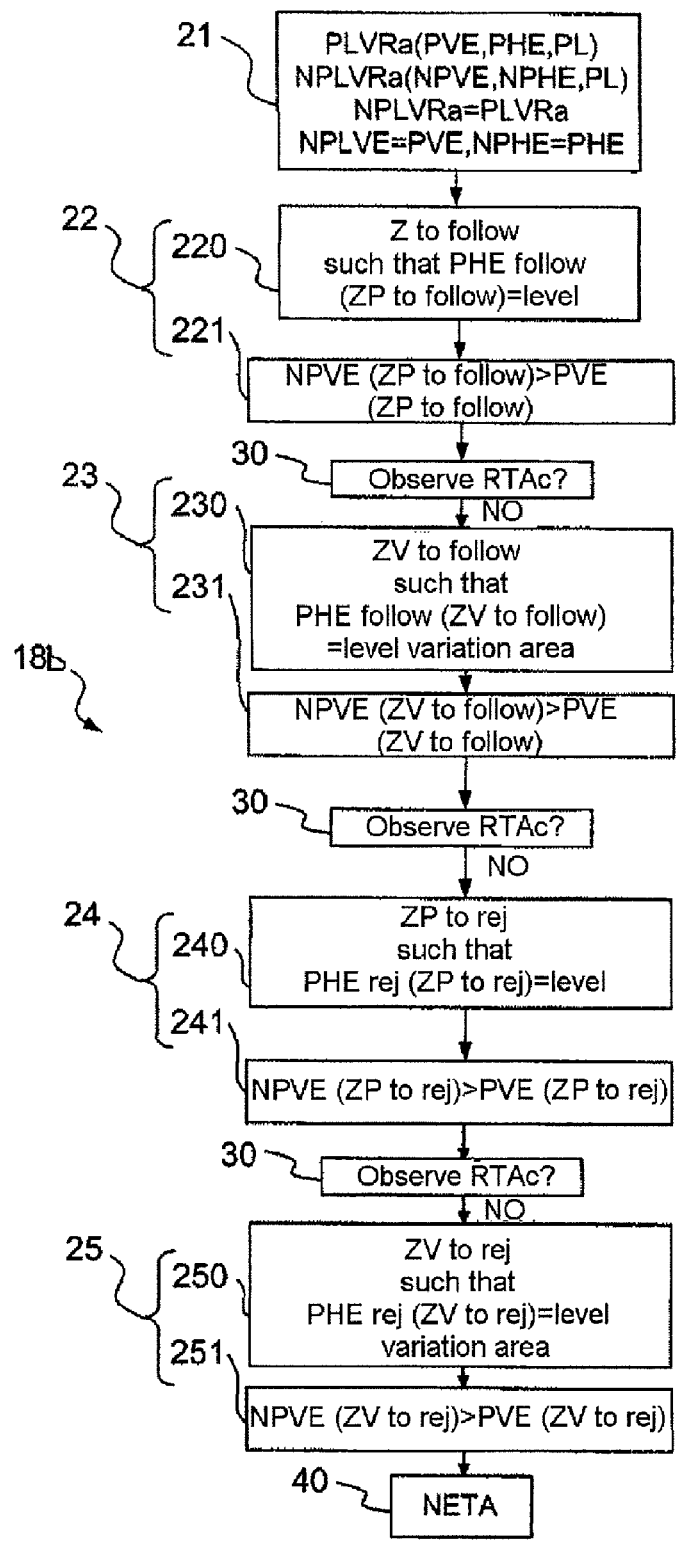

FIG. 3 details an embodiment of the delay catch-up strategy 18b. The advance limiting step which includes the same steps as the delay catch-up step but in which a new rallying flight plan including lower speeds than in the estimated speed profile is calculated will not be described. The delay catch-up step includes a step 21 for initialization of a new rallying flight plan on the rallying flight plan.

The delay catch-up method also includes the following four pairs of steps, performed in the following order:
 a first pair of steps 22, including a step for identification 220 of the following level area(s) ZPtofollow on which the estimated following vertical trajectory PHEfollow exhibits a level, and a step 221 for updating the new rallying flight plan on the following level area(s),
a second pair of steps 23, including a step 230 for identification of one or more following level variation area(s) ZVtofollow on which the estimated following vertical trajectory PHEfollow exhibits a level variation, and a step 231 for updating the new rallying flight plan on the following level variation area(s),
a third pair of steps 24, including a step 240 for identification of one or more rejoining level area(s) ZPtorej on which the estimated vertical trajectory PHErej exhibits a level, and a step 241 for updating the new rallying flight plan on the rejoining level area(s),
a fourth pair of steps 25, including a step 250 for identification of one or more rejoining level variation area(s) ZVtorej on which the estimated rejoining vertical trajectory PHErej exhibits a level variation, and a step 251 for updating the new rallying flight plan on the rejoining level variation area(s).

In this embodiment, the update area includes at least one following level area and possibly at least one following level variation, rejoining level, rejoining level variation area. In the delay catch-up procedure, as represented in FIG. 3, there are updated 221, 231, 241, 251 the new rallying flight plan on a following level area ZPtofollow, the following level variation ZVtofollow, rejoining level ZPtorej or rejoining level variation ZVtorej area(s), the new modified speed profile exhibits NPVE (ZPtofollow), NPVE (Vtofollow), NPVE (ZPtorej) and NPVE (ZVtorej) values greater than the estimated speed profile PVE (ZPtofollow), PVE (Vtofollow), PVE (ZPtorej), PVE (ZVtorej) on respective following level areas ZPtofollow, the following level variation ZVtofollow, rejoining level ZPtorej or rejoining level variation ZVtorej area(s) and vice versa in the advance limiting procedure.

The step for calculation of a new rallying flight plan amounts to initializing a new guidance setpoint on the guidance setpoint and to updating the new following and/or rejoining guidance setpoint on level areas and/or level variation areas, the estimated following and/or rejoining vertical trajectory such that the new speed profile calculated by integration of the state vector exhibits values greater than the estimated speed profile on the areas (and vice versa in the advance limiting procedure.)

The expression "level area" should be understood to mean a continuous area on the lateral trajectory whose length L is greater than a predetermined detection threshold on the lateral trajectory and on which the estimated vertical trajectory exhibits a constant altitude level. The term "level variation area" should be understood to mean a continuous area of the lateral trajectory with a length greater than the predetermined detection threshold situated outside a level area (it is therefore an area in which the altitude varies). The levels of the estimated rejoining vertical trajectory results, in most cases, from an altitude constraint to be kept to downstream, when the aircraft is under the calculated profile. This is, for example, a case in which the aircraft is situated below the vertical trajectory to be followed and in which it must keep an altitude constraint on the future trajectory. In this case, the conventional rejoining guidance setpoint is of the VS/SPD or FPA/SPD type respectively in which the vertical speed VS or the slope FPA respectively is set to rejoin the constraint, and the following speed setpoint is of the ALT/SPD type (in the example, in which the controls of the aircraft are the trim and the engine thrust, with the altitude (ALT) being kept to by the trim and the horizontal speed SPC being kept to by the thrust).

The level variation areas are, for example, identified by means of the rallying guidance setpoint which is the source of the estimated vertical trajectory. This is, for example, a guidance setpoint maintaining a constant non-zero slope (setpoint of the FPA/type) or a guidance setpoint imposing a constant non-zero vertical speed with a variable ground speed VS, or else a guidance setpoint of the OPEN type with constant thrust (the aircraft is left to ascend or descend freely according to the value of this thrust).

Between two successive pairs of steps, including a prior pair of steps and a subsequent pair of steps, the method possibly includes a step 30 for checking compliance with the calculated required time of arrival RTAc including the following steps (not represented):
calculation of an intermediate estimated time of arrival ETAI from the new rallying flight plan (which is the new flight plan which has just been updated),
calculation of an intermediate difference DAI between the intermediate estimated time of arrival ETAI and the calculated required time of arrival RTAc,
comparison between the intermediate difference DAI and the absolute tolerance T,
when the intermediate difference DAI departs from the absolute tolerance T, transition to the next pair of steps.

In this way, the method of modifying the new flight plan is stopped as soon as the delay is made up or the advance eliminated. When the time constraint is complied with, there is no transition to the next pair of steps. The new rallying flight plan that the aircraft now follows complies with the time constraint.

As a variant, the method includes a single step or a plurality of successive pairs of steps taken from among the first, the second, the third and the fourth pair of steps. In another embodiment, there is no check to verify whether the step for calculation of a new rallying flight plan has terminated.

A modification of the rallying flight plan over a given area does not always generate a modification of the new associated estimated vertical trajectory. For example, when a level variation area over the estimated following vertical trajectory results from a following guidance setpoint of the SPD/THR type, a modification of the new estimated vertical trajectory by means of a modification of the new following guidance setpoint over this area may give rise to a modification of the estimated vertical trajectory (steeper slope). By acting on the thrust with a guidance setpoint of the FPA/SPD type with an FPA slope equal to the slope formed by the estimated vertical trajectory with the ground, the shape of the estimated vertical trajectory and the shape of the estimated speed profile are preserved. Likewise if the change of level of the estimated vertical trajectory results from a guidance setpoint of the VS/SPD type.

In the method according to the first embodiment, the new rallying flight plan is modified so as to modify the speed of the aircraft as a priority over the area of the lateral trajectory associated with the estimated following vertical trajectory. This stems from the fact that it is preferred to make up the delay as soon as possible over the trajectory. Flight plan modifications which might turn out to be needless are thus avoided. It is indeed possible that the delay or the advance are eliminated naturally during the flight. Likewise, it is more advantageous to begin the overhaul strategies over the level sections than over the changes of level. On a level section, the aircraft is vertically stabilized, and the thrust variations make it possible to modulate the speed with a view to overhauling a delay or an advance are less destabilizing to the aircraft and exhibit a more significant margin of manoeuvre since the major part of the "motive" energy of the craft is used to modulate the speed. The level areas are therefore advantageously preferably identified.

As a variant, only the areas corresponding to level areas and/or areas of variation of level exhibiting a length greater than a predetermined length L on the lateral trajectory are identified. This variant makes it possible to avoid short-duration engine jerks related to a modification of the speed (or of the guidance setpoint) over a short journey. The passengers are thus ensured maximum comfort.

Preferably, only the areas of level section or of change of level preceding the constraint point are identified at each pair of steps.

In a variant, the areas of level sections or of change of level are preferably identified over the descent phase and the areas closest to the approach phase are preferably identified over this descent phase. Indeed, it is no longer desirable to accelerate or to slow down with respect to the speed profile to be followed, during the approach phase. Late modification of the guidance setpoint is thus favoured. As a variant, only the areas of level section or of change of level situated a distance less than the predetermined threshold distance from the approach phase are identified.

Over the level section areas, the modification of the new estimated speed is for example obtained by integrating the state vector on the basis of a new guidance setpoint of the ALT/SPD type. This type of guidance setpoint makes it possible to impose on the aircraft a speed that is greater (or less in the case of the elimination of the advance) than that which possibly existed on the speed profile estimated at the level of the level section, that is to say to modify the estimated speed profile without modifying the estimated vertical trajectory. The SPD value of the speed depends on the strategy (overhaul/slow down). It is for example possible to calculate the value of horizontal speed which makes it possible to absorb the delay, and the corresponding thrust. If it is in an admissible thrust span (i.e. between thrust Min and thrust Max), this value can be taken. If it is not, the admissible thrust can be used and the residual speed deviation can be absorbed over another level section or over a slope variation, such as explained in the invention.

Over a change of level area it is for example possible to require the new guidance setpoint to be of the IDLE/SPD type. Now, in the case where an area of change of level over the estimated vertical trajectory results from the integration of the state of the aircraft based on a guidance setpoint of the IDLE thrust/SPD type corresponding to an idle thrust of value IDLE thrust, corresponding in general to the admissible thrust Min) and on a feedback in terms of horizontal speed by the trim adapted to make energy savings, there is no engine thrust margin for imposing a lower speed of the aircraft with the same type of guidance setpoint. Conversely, an acceleration margin is available.

In a variant, a constraint is imposed on the new rallying flight plan updated over a determined area. For example, it is preferable that the new rallying flight plan updated over a determined area be obtained on the basis of a new guidance setpoint of predetermined type. If it is not possible to obtain a new value of the new estimated speed profile on the basis of a guidance setpoint of this type, the new rallying flight plan is not modified over this area.

Another type of constraint consists in requiring the new estimated speed profile to exhibit values lying in a predetermined envelope of speeds or lying in a predetermined speed interval and/or to exhibit accelerations that are lower, in absolute value, than a maximum acceleration. The fact of bounding the speed to a value below a given speed makes it possible to avoid vertical discontinuities ("Too Steep Path"). Indeed, if one argues from the energy point of view, the movements of the aircraft in space correspond to a movement in terms of altitude (potential energy) and in terms of speed (kinetic energy). If the energy is used preferably for a movement in terms of speed (kinetic energy), less margin remains for a movement in terms of altitude (potential energy), the ground slope FPA that one wishes to follow is smaller: thus, altitude constraints inducing a ground slope to be held may become untenable. A discontinuity called "Too Steep Path" appears in the altitude profile.

Advantageously, the pairs of steps include prior to the step for updating 221, 231, 241, 251 the new rallying flight plan, a step for checking calculation of a new estimated rallying flight plan, followed by a step for satisfying at least one predetermined constraint imposed on the new rallying flight plan (like those set forth hereinabove), and if at least one constraint is not satisfied, there is a return to a step for identifying a level section or rejoining area 220, 230, 240, 250 otherwise there is transition to the step for updating the new rallying flight plan.

By updating the calculated required time of arrival at each loop; the estimated time of arrival according to an embodiment of the invention converges to the required time of arrival. Stated otherwise, the method of flight management makes it possible to calculate a rallying flight plan which obeys the time constraint. On completion of the procedure for overhauling the delay or eliminating the advance, the method according to the first embodiment includes:

a step 40 for calculation of a new estimated time of arrival NETA at the constraint point Pc based on the new rallying flight plan, that is to say by integrating the state of the aircraft based on the new rallying guidance setpoint, a step 41 for calculation of a new arrival time difference NDA between the new estimated time of arrival NETA and the calculated required time of arrival RTAc, a step 42 for comparing the new arrival time difference NDA and a predetermined guidance tolerance T, when the new arrival time difference NDA departs from a predetermined guidance tolerance, a new calculated required time of arrival NRTAc is calculated 43. Thereafter, the calculated required time of arrival is replaced 44 with the new calculated required time of arrival before returning to the step 11 for calculation of a flight plan to be followed.

The new calculated required time of arrival NRTAc depends on the calculated required time of arrival RTAc and on a function f dependent on the difference between the calculated required time of arrival and the new estimated time of arrival NETA. The new calculated required time of arrival is of the type: NRTAc=f(RTAc−NETA)+RTAc The function f is for example a gain k multiplied by the difference between the calculated time of arrival and the new estimated time of arrival NETA. The gain k is a real number the value of which can be adjusted according to the conventional techniques of engineers in the science of Automation. The value of the gain is adjusted so as to balance the speed of convergence of the loop with respect to possible instabilities.

As a variant, the function f is of the type:

$$f(RTAc - NETA) = k1*(RTAc - NETA) + k2\frac{d(RTAc - NETA)}{dt}$$

Where a first gain k1 and a second gain k2 are real numbers whose values are adjusted by the techniques of automation to ensure satisfactory convergence and stability.

$$\frac{d(RTAc - NETA)}{dt}$$

is the derivative of the difference between the calculated required time of arrival and the new estimated time of arrival NETA with respect to time.

The function f could moreover depend on the guidance setpoint and/or optionally on the time deviation between the time of arrival at the altitude rejoining point on the vertical trajectory to be followed and the estimated time of arrival at this same point.

The method optionally includes, after the step for calculation of a rallying flight plan, a step for checking compliance with a condition for transition to the step for calculation of the new estimated time of arrival. This step consists in checking whether the physical limits of the aircraft are attained. When they are attained, there is no transition to the step for calculating the new estimated time of arrival. When they are not attained, the new estimated time of arrival is calculated. The physical limits of the aircraft are attained if, for example, the estimated speed profile based on the rallying guidance setpoint lies on the predetermined speed envelope (for example if the speed of the speed profile lies on the upper limit of the envelope whereas the arrival time difference is negative. Other physical limits may be taken into account such as for example a maximum allowable load factor (acceleration in the vertical plane) guaranteeing passenger comfort for example.

As a variant, when the new arrival time difference NDA departs from the absolute tolerance, the method does not include steps 43, and 44, there is a direct return to the step 11 for calculation of the flight plan to be followed or indeed there is a return to the step 13 for calculation of the rallying flight plan when the method does not include step 11 for calculation of the flight plan to be followed. The return to the step for calculation of the flight plan to be followed is optionally preceded by a step for updating (not represented) the first optimization criterion.

A first embodiment of the method according to the invention has been described, in which, at a given instant, a speed profile to be followed and a vertical trajectory to be followed making it possible to comply with a time constraint are calculated. They are not preset. They are recalculated at each loop while the new estimated time of arrival is different from the calculated required time of arrival by modifying the first optimization constraint and/or the calculated required time of arrival.

There are cases where the flight plan to be followed is preset. These are for example cases where the aircraft is close to arrival, for example when it is in the approach phase. The flight plan to be followed is calculated to comply with constraints of relief and traffic space, in addition to the time constraint. When the aircraft deviates from the vertical trajectory to be followed or from the speed profile to be followed, one seeks to determine a rallying flight plan which brings the aircraft back to them whilst complying with the time constraint. For this purpose, a method is implemented according to a second embodiment corresponding to a method according to the first embodiment divested of the steps 10 for initializing the calculated time of arrival to the required time of arrival (the calculated time of arrival is then equal to the required time of arrival) for calculation 11 of the flight plan to be followed and pairs of steps 22, 23 for modification of the new rallying flight plan over areas of level sections and of change of level on the estimated following vertical trajectory. In this way, neither the speed nor the trajectory of the aircraft are altered from the moment at which the aircraft has rallied to the speed profile to be followed and the vertical trajectory to be followed.

As a variant, the method includes prior to the return to the step 11 for the calculation of a flight plan to be followed, a step for modifying a first and/or a second optimization criterion satisfied respectively by the flight plan to be followed PLV and the rallying flight plan PLVRa.

Aspects of the invention also relate to a flight management system including means for implementing the method according to the invention.

The FMS passes over to the aircraft to servocontrol the trajectory and the speed profile of the aircraft to the rallying flight plan once the latter complies with the time constraint.

The present invention is not limited to the embodiments described herein, reference should be had to the appended claims.

The invention claimed is:

1. A method for assisting in a flight management of an aircraft aiming to achieve a constraint point, said method comprising the following steps:
   detecting a possible deviation that exists at a given instant between the aircraft and a flight plan to be followed that said aircraft is assumed to have to follow, said flight plan to be followed including a speed profile to be followed and a vertical trajectory to be followed and being calculated to observe a calculated required time of arrival RTAc at said constraint point,
   when the aircraft is deviating from said flight plan to be followed, calculating a rallying flight plan, rallying said flight plan to be followed, said rallying flight plan including an estimated vertical trajectory and an estimated speed profile,
   calculating an estimated time of arrival ETA at said constraint point based on the rallying flight plan,
   calculating an arrival time difference between the estimated required time of arrival ETA and the calculated required time of arrival RTAc,
   comparing the arrival time difference and an absolute tolerance,
   when the arrival time difference departs from the absolute tolerance, calculating a new rallying flight plan including a new estimated speed profile different from the estimated speed profile over at least one update area, said new estimated speed profile including, over said update area:
   either a value greater than that of the estimated speed profile, if the arrival time difference is positive,
   or a value less than that of the estimated speed profile, if the arrival time difference is negative, the estimated vertical trajectory and the estimated speed profile respectively including an estimated rejoining speed profile and an estimated rejoining vertical trajectory respectively rallying the speed profile to be followed and the vertical trajectory to be followed, at respective speed rejoining and vertical rejoining points, and being continued respectively by an estimated following speed profile and an estimated following vertical trajectory, respectively merged with the speed profile, the speed profile to be followed and the vertical trajectory to be followed, the step for calculation of a new rallying flight plan including initializing the new rallying flight plan on the rallying flight plan and also including at least one of the following pairs of stages:
   a first pair of stages, comprising a step for identification of one or more following level areas on which the estimated following vertical trajectory exhibits a level, and a step for updating the new rallying flight plan on the following level areas a second pair of stages, comprising a step for identification of one or more following level variation areas on which the estimated following vertical trajectory exhibits a level variation, and a step for updating the new rallying flight plan on the following level variation areas, a third pair of stages, comprising a step for identification of one or more rejoining level areas on which the estimated vertical trajectory exhibits a level, and a step for updating the new rallying flight plan on the rejoining level areas, a fourth pair of stages, comprising a step for identification of one or more rejoining level variation areas on which the estimated rejoining vertical trajectory exhibits a level variation, and a step for updating the new rallying flight plan on the rejoining level variation areas.

2. The method for assisting in the flight management of an aircraft according to claim 1, wherein the first, second, third, and fourth pairs of steps comprise, prior to the step for updating the new rallying flight plan, a step for calculation of a new estimated rallying flight plan followed by a step for satisfying at least one predetermined constraint imposed on the new rallying flight plan and, if at least one predetermined constraint is not satisfied, a return to the step for identification of a level or level variation area, otherwise a transition to the step for updating the new rallying flight plan.

3. The method for assisting in the flight management of an aircraft according to claim 2, wherein the step for calculation of a new rallying flight plan comprises a plurality of pairs of successive steps taken from the first, the second, the third and the fourth pairs of steps, and in that, between two successive pairs of steps comprising a pair of steps subsequent to a prior pair of steps, the method comprises a step for checking compliance with the calculated required time of arrival comprising the following steps:

calculating an intermediate estimated time of arrival based on the new rallying flight plan, calculating an intermediate difference between the intermediate estimated time of arrival and the calculated required time of arrival RTAc, comparing between the intermediate difference and the absolute tolerance, if the intermediate difference departs from the absolute tolerance, transitioning to the next pair of steps, otherwise, not transitioning to the next pair of steps.

4. The method for assisting in the flight management of an aircraft according to claim 3, wherein the step for calculation of a new rallying flight plan comprises, in the following order, the first, the second, the third and the fourth pairs of steps.

5. The method for assisting in the flight management of an aircraft according to claim 1, wherein the level or level change areas on the descent phase that are closest to the approach phase are preferably identified.

6. The method for assisting in the flight management of an aircraft according to claim 1, wherein only the level or level change areas situated at a distance less than a predetermined threshold distance from the approach phase are identified.

7. The method for assisting in the flight management of an aircraft according to claim 1, wherein the level areas are preferably identified.

8. The method for assisting in the flight management of an aircraft according to claim 1, wherein at least one of the following level and rejoining level and following level variation and rejoining areas that exhibit a length greater than a predetermined detection length on the lateral trajectory is/are identified as a priority.

9. The method for assisting in the flight management of an aircraft according to claim 1, wherein the new estimated speed profile exhibits, on said update areas either a speed chosen such that it exhibits an acceleration greater than that of the estimated speed profile, if the arrival time difference is positive, or a speed chosen such that it has a deceleration less than that of the estimated speed profile, if the arrival time difference is negative.

10. The method for assisting in the flight management of an aircraft according to claim 1, wherein prior to the step for detection of a possible deviation between said aircraft and said flight plan to be followed, a step for initializing the calculated required time of arrival RTAc on the value of the required time of arrival RTA.

11. The method for assisting in the flight management of an aircraft according to claim 10, wherein subsequent to the step for calculation of a new rallying flight plan and before the step for return to the calculation of the flight plan to be followed, the method includes:

a step for calculating a new estimated time of arrival NETA at the constraint point based on the new rallying flight plan, a step for calculating a new arrival time difference NDA between the new estimated time of arrival NETA and the calculated required time of arrival RTAc, a step for comparing the new arrival time difference NDA and the absolute tolerance, when the new arrival time difference (NDA) departs from a predetermined guidance tolerance, a step for calculating a new calculated required time of arrival NRTAc dependent on the calculated required time of arrival RTAc and on a function f of the difference between the calculated required time of arrival RTAc and the new estimated time of arrival satisfying the following equation:

$$NRTAc = f(RTAc - NETA) + RTAc$$

a step for replacing the calculated required time of arrival RTAc with the new calculated required time of arrival NRTAc.

12. A system for assisting flight management comprising a programmed processor and a memory with instructions which cause the processor to:

detect a possible deviation that exists at a given instant between the aircraft and a flight plan to be followed that said aircraft is assumed to have to follow, said flight plan to be followed including a speed profile to be followed and a vertical trajectory to be followed and being calculated to observe a calculated required time of arrival RTAc at said constraint point, when the aircraft is deviating from said flight plan to be followed, calculate a rallying flight plan, rallying said flight plan to be followed, said rallying flight plan including an estimated vertical trajectory and an estimated speed profile, calculate an estimated time of arrival ETA at said constraint point based on the rallying flight plan, calculate an arrival time difference between the estimated required time of arrival ETA and the calculated required time of arrival RTAc, compare the arrival time difference and an absolute tolerance, when the arrival time difference departs from the absolute tolerance, calculate a new rallying flight plan including a new estimated speed profile different from the estimated speed profile over at least one update area, said new estimated speed profile exhibiting, over said update area(s):

either a value greater than that of the estimated speed profile, if the arrival time difference is positive, or a value less than that of the estimated speed profile, if the arrival time difference is negative, the estimated vertical trajectory and the estimated speed profile respectively including an estimated rejoining speed profile and an estimated rejoining vertical trajectory respectively rallying the speed profile to be followed and the vertical trajectory to be followed, at respective speed rejoining and vertical rejoining points, and being continued respectively by an estimated following speed profile and an estimated following vertical trajectory, respectively merged with the speed profile, the speed profile to be followed and the vertical trajectory to be followed, the step for calculation of a new rallying flight plan including-initializing the new rallying flight plan on the rallying flight plan and also including at least one of the following pairs of stages:

a first pair of stages, comprising a step for identification of one or more following level areas on which the estimated following vertical trajectory exhibits a level, and a step for updating the new rallying flight plan on the following level areas, a second pair of stages, comprising a step for identification of one or more following level variation areas on which the estimated following vertical trajectory exhibits a level variation, and a step for updating the new rallying flight plan on the following level variation areas, a third pair of stages, comprising a step for identification of one or more rejoining level areas on which the estimated vertical trajectory exhibits a level, and a step for updating the new rallying flight plan on the rejoining level areas, a fourth pair of stages, comprising a step for identification of one or more rejoining level variation areas on which the estimated rejoining vertical trajectory exhibits a level variation, and a step for updating the new rallying flight plan on the rejoining level variation areas.

* * * * *